United States Patent
Boozer et al.

(10) Patent No.: US 10,856,697 B2
(45) Date of Patent: Dec. 8, 2020

(54) BLENDING SYSTEM

(71) Applicant: Vita-Mix Management Corporation, Olmsted Township, OH (US)

(72) Inventors: Richard Boozer, Wakeman, OH (US); Stephen Rukavina, Rocky River, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 0 days.

(21) Appl. No.: 15/736,003

(22) PCT Filed: Jun. 15, 2016

(86) PCT No.: PCT/US2016/037525
§ 371 (c)(1),
(2) Date: Dec. 13, 2017

(87) PCT Pub. No.: WO2016/205297
PCT Pub. Date: Dec. 22, 2016

(65) Prior Publication Data
US 2018/0168403 A1  Jun. 21, 2018

Related U.S. Application Data

(60) Provisional application No. 62/175,773, filed on Jun. 15, 2015.

(51) Int. Cl.
*A47J 43/07* (2006.01)
*B01F 15/00* (2006.01)
*B01F 7/16* (2006.01)
*A47J 43/046* (2006.01)

(52) U.S. Cl.
CPC .......... *A47J 43/0727* (2013.01); *A47J 43/046* (2013.01); *A47J 43/0722* (2013.01); *B01F 7/1675* (2013.01); *B01F 15/00896* (2013.01); *B01F 2215/0014* (2013.01)

(58) Field of Classification Search
CPC .. A47J 43/046; A47J 43/0722; A47J 43/0727; B01F 15/00896; B01F 2215/0014; B01F 7/1675
See application file for complete search history.

(56) References Cited

U.S. PATENT DOCUMENTS

| | | | |
|---|---|---|---|
| 3,240,246 A | 3/1966 | Dewenter | |
| 8,197,121 B2 * | 6/2012 | Sands | A47J 43/0722 241/199.12 |

(Continued)

OTHER PUBLICATIONS

Patent Cooperation Treaty (PCT), International Search Report and Written Opinion for Application PCT/US2016/037525 filed Jun. 15, 2016, dated Oct. 21, 2016, International Searching Authority, US.

*Primary Examiner* — Tony G Soohoo
(74) *Attorney, Agent, or Firm* — McDonald Hopkins LLC

(57) ABSTRACT

A blending system is shown and described herein. The blending system may include a base including a motor, a blade assembly selectively and operably engaged with the base, where the motor drives the blade assembly, and a container having a cavity. The container includes a flute protruding from an inner surface. An exaggerated flute may extend closer to the blade assembly than the flute.

11 Claims, 12 Drawing Sheets

(56) References Cited

U.S. PATENT DOCUMENTS

| | | | |
|---|---|---|---|
| 8,550,695 B2* | 10/2013 | Conti | A47J 43/0727 366/205 |
| 2013/0033959 A1* | 2/2013 | Conti | A47J 43/0727 366/314 |
| 2013/0077433 A1* | 3/2013 | Conti | A47J 43/0727 366/205 |
| 2014/0263784 A1* | 9/2014 | Nernberger | B01F 7/0015 241/100 |

* cited by examiner

BLENDING SYSTEM

RELATED APPLICATIONS

This application is a 35 U.S.C. 371 national stage filing of PCT Application No. PCT/US2016/037525 filed Jun. 15, 2016, and entitled "BLENDING SYSTEM," which claims the benefit of U.S. Provisional Patent Application Ser. No. 62/175,773, filed Jun. 15, 2015, and entitled "BLENDING SYSTEM," the entirety of which are incorporated herein by reference.

FIELD OF THE INVENTION

The present invention relates to a blending system and, more particularly, to a blender container, blade assembly, and flow directing member for a blending system.

BACKGROUND

Blenders are used to prepare food items by performing a blending operation on foodstuff. A blender may include a container for receiving foodstuff and a blade assembly that is rotatable to blend the foodstuff received within the container. The blender container may comprise a working volume that is defined by the volume of space within the container that is generally exposed to the blade assembly. In other words, the working volume is the volume of space that foodstuff may be received within the container for blending.

During blending of foodstuff, blades may be rotated by a motor. The blades may force foodstuff toward an inner wall of a container. The food may form a vortex or funnel shape about the blades. This vortex shape may result in the blades being exposed or partially free of foodstuffs during the blending. For example, when blending ingredients, the ingredients may coat the walls of the container and may be pushed outward away from the blades. The foodstuffs will not be focused by the blades, and extra time may be needed to blend or otherwise prepare the foodstuff.

Similarly, foodstuff is placed in the container of a blender in order to be blended. However, the working volume of the container is often larger than is optimal for foodstuff to be blended. For example, if not confined to a smaller volume, it may take longer than is optimal to blend a smoothie or any other kind of foodstuff.

Further, in blending recipes, the efficiency of breaking down ingredients and/or increasing temperature rise may be slowed due to ingredients splashing around a large blending area and the ingredients being forced away from the blades. Therefore, there is a need to decrease the time to heat the ingredients.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

A blending system having various innovative features is provided herein. The blending system may include a blender container, a blade assembly, and a flow directing member. The blade assembly may be configured to removably attach to the blender container. Foodstuff may be inserted into the blender container. A motor may drive the blade assembly to cause rotation or movement of blades of the blade assembly. The blades may be a length that is less than an internal diameter of a portion of the blender container. The blades may also be positioned at a first distance from a distal end or opening of the blender container, and a second distance from a proximal end or bottom of the blender container.

The blender container may include flutes that protrude from an inner wall of the blender container. The flutes may run along the walls from near a bottom of the blender container towards a top of the container. The flutes may include exaggerated portions that protrude a greater distance from the walls than the flutes.

The flow directing member may be removably attached to the blender container near a distal end of the blender container. When inserted into the blender container, arms of the flow directing member may extend downwards from an attachment member of the flow directing member towards a proximal end of the blender container. The arms may be positioned adjacent to an internal wall of the blender container. The arms may also interact with flutes of the blender container to prevent the arms from moving during a blending process.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and related methods, in which like reference characters refer to like parts throughout, and in which.

DETAILED DESCRIPTION

Figure 1:
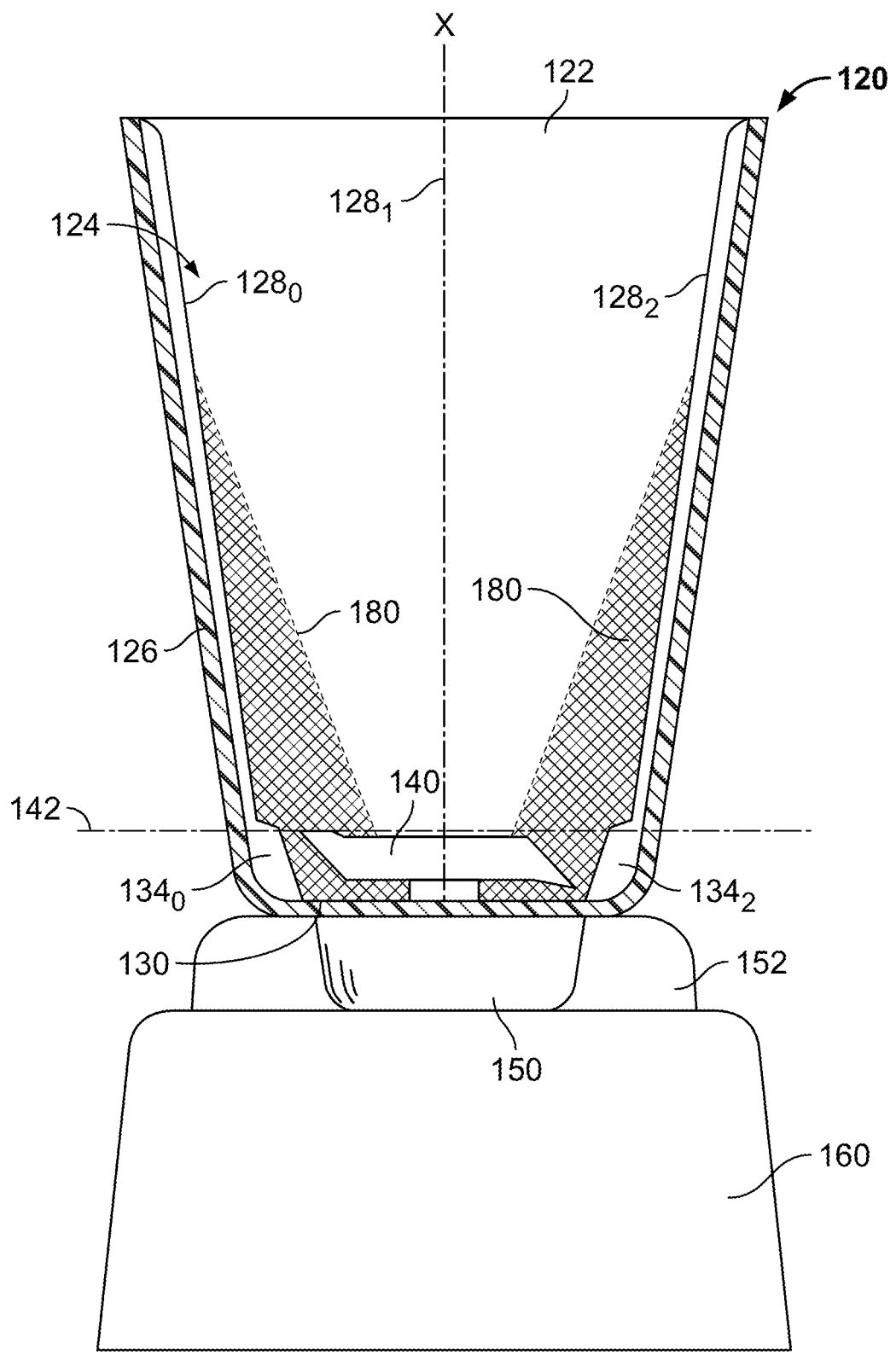
FIG. 1 is a partial cross-sectional view of a blender assembly.

Reference will now be made to exemplary embodiments, examples of which are illustrated in the accompanying drawings. It is to be understood that other embodiments may be utilized, and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Moreover, terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). Accordingly, embodiments or examples describing actions by a user do not necessarily require human actions.

The various embodiments described herein may include other components and/or functionality. It is noted that while various embodiments refer to a blender or a blender system, various other systems may be utilized in view of embodiments described herein. For example, embodiments may be utilized in food processor systems, mixing systems, handheld blending systems, coffee grinders, spice grinders, various other food preparation systems, non-food mixing systems, and the like. As such, references to a blender or blender system are understood to include food processor systems, non-food mixing systems, or other mixing systems. Such systems may generally include a blender base that may include a motor, a controller, a display, a memory and a processor which may execute instructions stored in the memory. Further, such systems may include a blender container and a blade assembly. The blade assembly, the blender container, and the blender base may removably or irremovably attach. Foodstuff may be added to the blender container for blending of the foodstuff. Furthermore, while blending of "ingredients," "food," "contents," or "foodstuff" is described by various embodiments, it is noted that non-food stuff may be mixed or blended, such as paints, epoxies, construction material (e.g., mortar, cement, etc.), and the like.

Moreover, blending of foodstuff or ingredients may result in a blended product. Such blended products may include drinks (cold or hot), smoothies, shakes, soups, purees, or the like. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

In some traditional blending systems, a blade assembly may be provided within or coupled to a blender container. Foodstuff is added into the blender container, and the blade assembly is used to blend the foodstuff. During blending, the rotation of the blade assembly forces the foodstuff away from a center and towards the walls of the blender container. Such systems may suffer from increased blending times. For example, a vortex may be formed as foodstuff is blended. The vortex may be characterized as a generally conical or funnel shape including a center area having no foodstuff and a vortex wall comprising foodstuff (e.g., similar to a tornado configuration). Formation of a vortex may increase blending time (e.g., time to process foodstuff, impart heat into foodstuff, etc.) and reduce the efficiency of blending systems.

In other aspects, a user may be required to utilize another device, such as a tamper or agitator to manipulate the foodstuff. The user uses the agitator to manually move or disrupt the flow or position of the foodstuff. Additionally, when a user enters a small volume of foodstuff in a large container, the excess volume of the container may allow the foodstuff to splash around or jump. Splashing may reduce the efficiency of the blending system, such as by increasing blending time, reducing ability to impart heat, or otherwise negatively affecting blending processes.

Aspects of systems, apparatuses or processes described herein generally relate to blender assemblies, systems, or devices and related methods. In an embodiment, the blender assembly may include a blender container. The blender container may comprise a pitcher, bowl, cup, or other general shape. A blade assembly may be attached to a bottom of the blender container and a flow directing member may be attached to the blender container such that a portion of the flow directing member is at least partially inserted into a cavity of the container.

In an example, a user may insert or deposit foodstuff in the blender container. The blender container may be attached to a blender base, and the user may initiate a blending process. During the blending process, blades of the blade assembly may blend the foodstuff. Foodstuff is generally forced away from the blades from the motion of the blades as they rotate. In various embodiments, the blades of the blade assembly are positioned closer to walls of the blender container than conventional wisdom dictates. Further, the blades may be longer than conventional wisdom dictates. In another aspect, flutes or protrusions along inner walls of the blender container may disrupt the flow of foodstuff during the blending process. Such disruption may result in forcing foodstuff back into the blades of the blade assembly. Accordingly, an efficiency of the blending process may be altered (e.g., increased). For instance, a time required for blending may be reduced, a time required for imparting heat into the foodstuff may be reduced, energy consumption by a blender assembly may be reduced, and the like.

Further, foodstuff may be blended or processed without need of additional tools (e.g., tampers) or steps. For instance, foodstuff that includes high concentrations of frozen ingredients, various volumes of blends of foodstuff, foodstuff having properties making the foodstuff traditionally difficult to blend (e.g., small particles). In another aspect, blending of such foodstuff traditionally benefits from or requires user manipulation (e.g., via a tamper) to efficiently process the foodstuff. Described embodiments may process or fully process such foodstuff without need for user manipulation. It is noted that other improvements and novel aspects may be apparent from the description and drawings. For instance, this disclosure may facilitate reduction of blending times, more efficient blending processes, and various other improvements.

FIG. 1 is a partial cross-sectional view of a blender assembly 100. Blender assembly 100 may primarily include a blender container 120 for receiving food for blending, a blade assembly 140 for blending the food received within the blender container 120, a retainer nut assembly 150 for securing blade assembly 140 with blender container 120, and a blender base 160 that may control the blade assembly 140. The blender container 120 may operatively attach to the blender base 150 at an apron 152. It is noted that blender assembly 100 may include other components not shown for sake of brevity.

Blender container 120 may include a glass, plastic, metal, or other material. In various embodiments, the blender container 120 may be at least partially clear, opaque, colored, tinted, or the like. Blender container 120 may include a cavity 124 having an opening 122. The cavity 124 may be at least partially defined by side walls 126 and a bottom 130. Perimeters of the wall 126 may decrease in size from the opening 122 towards the bottom 130, such as in a conical-like fashion. That is, cross-sectional perimeters of the wall 126 may become smaller along the X-axis from opening 122 to bottom 130. It is noted, however, that various other shapes or configurations may be utilized. Further, perimeters of the wall 126 may be substantially equal along portions of the X-axis. While a blender container is generally described as attaching to a blender base at a bottom of the blender container and having an opening when attached to the blender container, it is noted that other blender containers may be utilized. For instance, described aspects may be utilized with a single serving blender container that may be configured to attach to a blade assembly or blender base at or near an opening of the blender container. When such single serving blender systems are assembled, the single serving blender container may be closed or sealed.

In an aspect, retainer nut assembly 150 may have an increased mass relative to traditional blending systems. Such an increased mass may facilitate reduced vibration or movement of the container 120 or blender base 160, reduced levels of sound, and/or allow for increased amounts of force imparted in foodstuff 180 (e.g., through blade assembly 140). For instance, the weight or mass of the retainer nut assembly 150 may be between h grams and f grams, where h and f are numbers. In an example, the retainer nut may be about 232 g (e.g., about half a pound), 400 g, 450 g (e.g., about 1 pound), about 1,360 g (e.g., about 3 pounds), or the like. It is noted that the weight may refer to a particular portion of the retainer nut assembly 150 or the retainer nut assembly 150 as a whole. In an aspect, the increase weight of the retainer nut assembly 150, with respect to other blenders, may reduce vibration and noise produced from operation of blender system 100.

Figure 2:
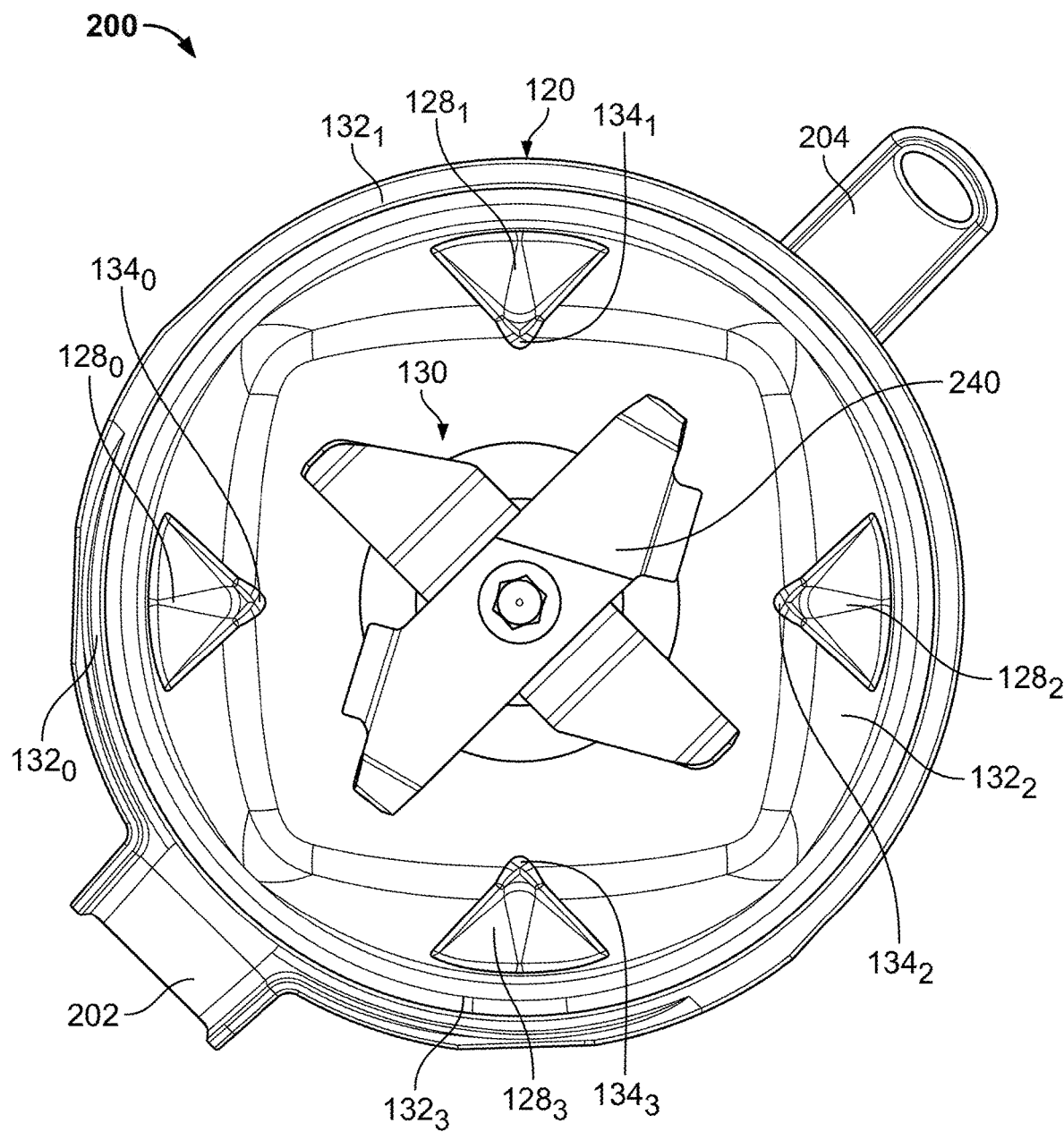
FIG. 2 is a top view of a blender assembly.
Figure 3:
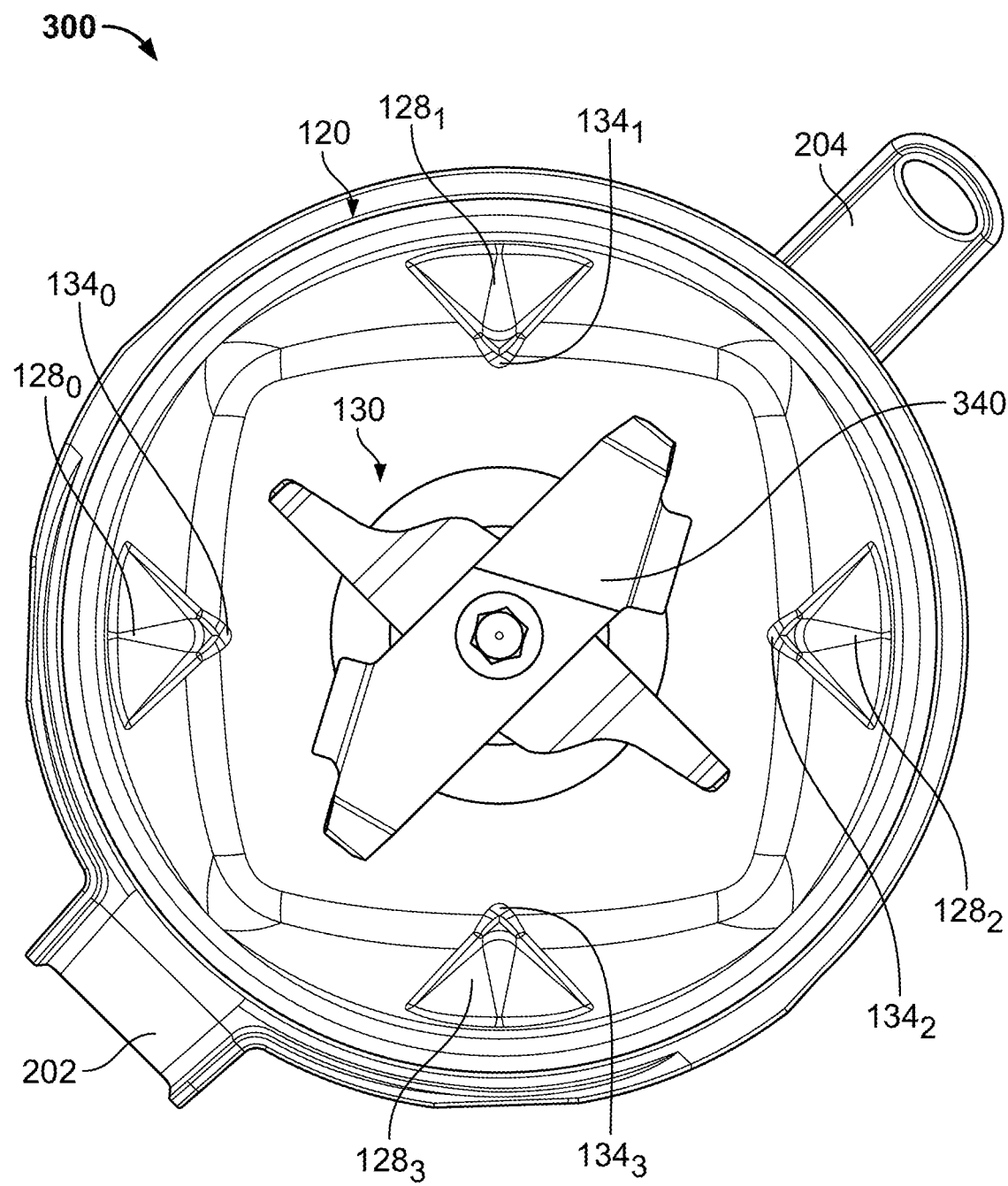
FIG. 3 is a top view of another blender assembly.

Turning to FIGS. 2 and 3, with reference to FIG. 1, there are blending assemblies 200 and 300. In embodiments, blending assemblies 200 and 300 may each comprise blender container 120. In another aspect, blending assembly 200 may include blade assembly 240, and blending assembly 300 may include blade assembly 340 as described in more detail herein. It is further noted that FIGS. 2 and 3 may depict aspects of blender container 120 that are not shown in FIG. 1, such as spout 202 and handle 204.

Blender container 120 may comprise areas or sides $132_0$, $132_1$, $132_2$, and $132_3$; such sides refer to a general area of side walls 126 and may not refer to a geometric side—for instance, blender container 120 may have curved or cylindrical side walls 126. As depicted, bottom 130 of blender container 120 may be predominantly rectangular or square, while opening 122 may be predominantly circular. In an aspect, perimeters formed by sides $132_0$, $132_1$, $132_2$, and $132_3$ may transition from generally square in shape when proximal to bottom 130 to generally circular in shape when proximal to opening 122.

Each side of sides $132_0$, $132_1$, $132_2$, and $132_3$ may include one or more ridges or flutes $128_0$, $128_1$, $128_2$, and $128_3$. Said flutes may include a protrusion that extends from wall 126 towards cavity 124. Flutes $128_0$, $128_1$, $128_2$, and $128_3$ may run substantially vertically from at or near bottom 130 to at or near opening 122. A shape of said flutes $128_0$-$128_3$ may be a general triangular-prism shape. For instance, the flutes $128_0$-$128_3$ may include sides that slope or angle towards a vertex. In various other embodiments, said flutes may include other shapes or dimensions. Likewise, said flutes may be positioned at various locations or areas along interiors of sides $132_0$, $132_1$, $132_2$, and $132_3$. While depicted as generally similar in lengths and dimensions, it is noted that one or more of said flutes may comprise different lengths, dimensions, or the like. Moreover, while four flutes are depicted, it is noted that the container 120 may include j flutes, where j is a number. For example, container 120 may include one or more flutes.

In embodiments, flutes $128_0$, $128_1$, $128_2$, and $128_3$ may include one or more exaggerated members, such as exaggerated members $134_0$, $134_1$, $134_2$, and $134_3$. Exaggerated members $134_0$, $134_1$, $134_2$, and $134_3$ may extend past flutes $128_0$, $128_1$, $128_2$, and $128_3$ in one or more directions. For instance, said exaggerated members $134_0$-$134_3$ may be configured to encompass a larger surface area (e.g., in a given cross-section) than said flutes $128_0$-$128_3$ and/or extend closer to the X-axis or blade assembly 140. In another aspect, exaggerated members $134_0$-$134_3$ may extend past flutes $128_0$-$128_3$ such that a portion of an exaggerated flute is closer to the X-axis than any portion of a flute. Further, it is noted that a flute may comprise one or more exaggerated members positioned along portions of the flute. In other embodiments, exaggerated members may be at different locations than said flutes or may be separate formations than the flutes.

In at least one embodiment, one or more of exaggerated members $134_0$-$134_3$ may extend generally vertically from proximal bottom 130 towards opening 122. For instance, an exaggerated member may extend for a length from at or near bottom 130 to a point at or near the highest vertical point 142 of blade assembly 140. In other embodiments, the exaggerated member terminates at an area at or between point 142 and bottom 130, or an area from at or between point 142 to opening 122.

In an example, when foodstuff 180 (e.g., shaded area in FIG. 1) is blended, the blend of foodstuff 180 may form a vortex or funnel shape, such that it is generally forced away from axis X. Blade assembly 140 may force or push the foodstuff 180 towards wall 126. This may result in less foodstuff being in the working path of the blade assembly 140. Flutes $128_0$-$128_3$ and/or exaggerated members $134_0$-$134_3$ may impinge the flow of foodstuff 180 and may disrupt or collapse formation of a vortex. Collapsing of the vortex may force foodstuff 180 towards the blade assembly 140 so it may impart work into the foodstuff.

It is noted that the blade assemblies 140, 240, 340, and other blade assemblies described herein may be operatively disposed within a container. In an aspect, the blades of the blade assemblies may be closer to the containers (e.g., side walls, flutes, exaggerated members, bottoms, etc.) than conventional wisdom teaches. For instance, the blades may span about q % to w % of the distance from exaggerated portion to exaggerated members $134_0$-$134_3$, where q and w are numbers and q is less than w. In an example, q may be about 90 and w may be about 98. In another example, q may be about 94 and w may be about 95. According to a further example, q may be about 95 and w may be about 96.

It is further noted that the blades may be described with reference to other portions of the container. As an example, the blades may be described with reference to the side wall 126. The container 120 may be various shapes, such as generally rectangular. Because of this the distance between the walls (e.g., a distance passing through axis X, a diameter, etc.) may be variable at the various points. The blades may be between For instance, the blades may span about q % to w % of the distance from side wall 126, where q and w are numbers and q is less than w. In an example, q may be about 70 and w may be about 86. In another example, q may be about 71 and w may be about 83. According to a further example, q may be about 72 and w may be about 84.

Figure 4:
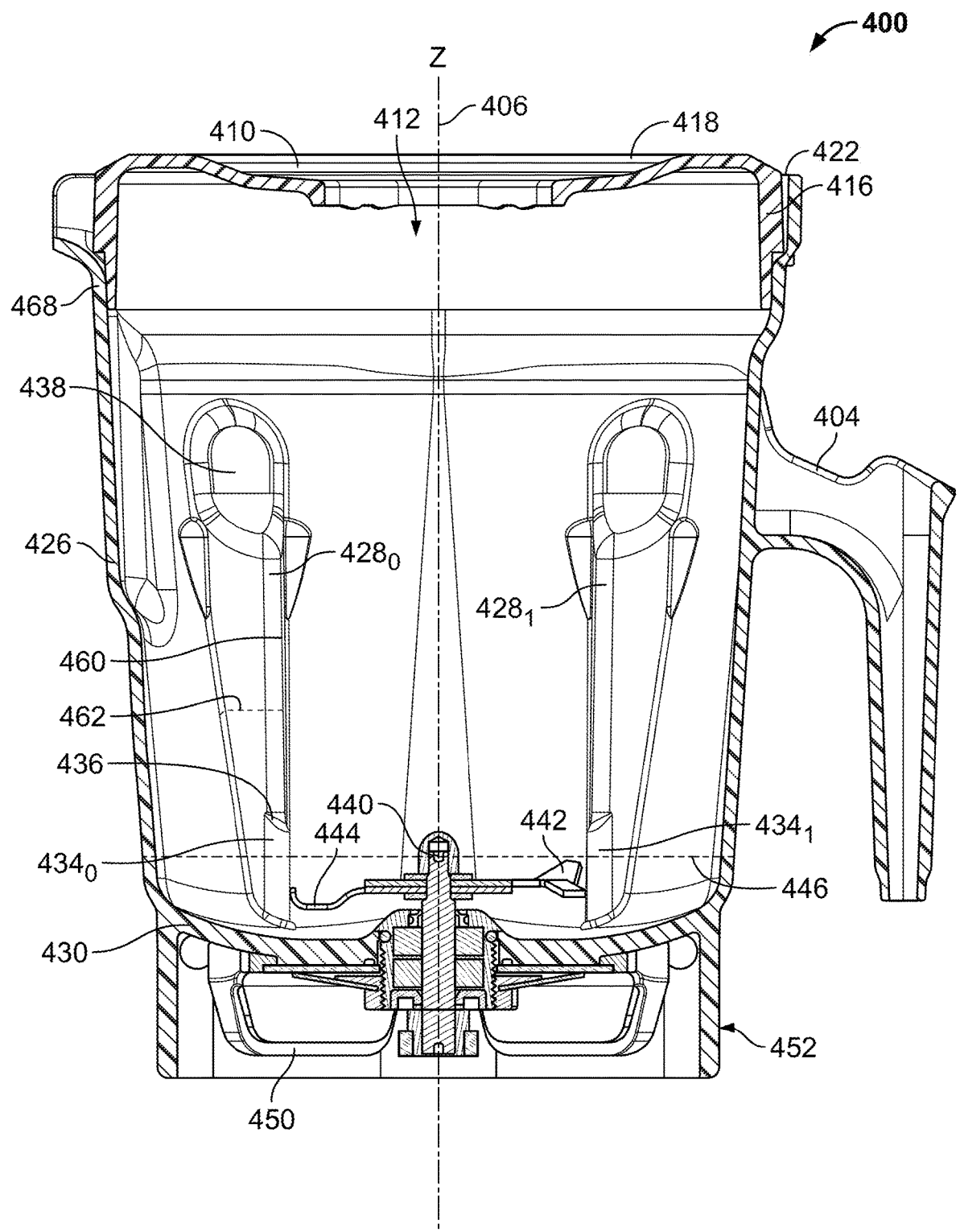
FIG. 4 is a partial cross-sectional view of a blender assembly including exaggerated flutes.

FIG. 4 is a partial cross-sectional view of blender system 400 in accordance with various aspects disclosed herein. Blender system 400 may include a blender container 420 and a blender base (not shown). It is noted that various components of blender system 400 may comprise similar features or functions as those described with reference to the other disclosed figures. For instance, blade assembly 440 may be substantially similar to blade assembly 140, 240, 340, or the like. In another aspect, blender container 420 may comprise similar aspects and/or functionality as other described blender containers, such as blender container 110, unless context suggests otherwise or warrants a particular distinction among such components. It is further noted that various combinations of blender system 400 and other blender systems described herein are considered within the scope and spirit of this disclosure.

Blender container 420 may comprise one or more materials as described herein. In an aspect, blender container 420 may be monolithically formed, formed of a separate component, or the like. For instance, blender container 420 may comprise a food-grade plastic material that may be molded, formed of separate parts joined together, or may be otherwise formed. In embodiments, the blender container 420 may comprise side wall 426 and bottom 430. The side wall 426 and bottom 430 may define a cavity for receiving and processing foodstuff.

As depicted, blender container 420 may include one or more flutes $428_0$-$428_1$. Flutes $428_0$-$428_1$ may comprise generally rigid protrusions from side wall 426 generally towards axis 406. It is noted that blender container 420 may include other flutes not shown for sake of brevity. Furthermore, each flute may include an exaggerated member, such as exaggerated members $434_0$ and $434_1$. Exaggerated members $434_0$ and $434_1$ may comprise a portion of the flutes $428_0$-$428_1$ that may extend closer to axis 406 than other portions of the flutes $428_0$-$428_1$. The exaggerated members $434_0$ and $434_1$ may be proximal to bottom 430 and/or blade assembly 440.

In at least one embodiment, flute $428_0$ and/or exaggerated member $434_0$ may extend from proximal the bottom 430 towards open end 422 of container 420. It is noted that the flutes $428_0$-$428_1$ may extend a portion of the length of a side wall 426 of the container, as measured from bottom 430 towards the open end 422. As an example, flutes $428_0$-$428_1$ are depicted as extending from proximal bottom 430 to generally below the open end 422. In another aspect, the exaggerated member $434_0$ is depicted as extending from proximal the bottom 430 to a terminal end 436, which may comprise a tapered surface that tapers towards the flute $428_0$. It is noted that the exaggerated member $434_0$ may extend to a height that may be generally higher than the highest point 446 of blades 440. It is noted, as described herein, that the terminal end 436 may be below or generally level with highest point 446.

The flute $428_0$ may extend from bottom 430 to terminal end 438, which may be tapered or curved towards the side wall 426. In an aspect, terminal end 438 may provide a surface of a lid or other component to rest on and/or to contact to prevent the component from being inserted further than desired. For example, terminal end 438 may comprise a stop or seat that may receive an insert, such as a volume reducing lid, tamper, etc. The stop may prevent insertion of such an insert beyond a desired depth. For example, the stop may prevent an insert from coming into contact with blade assembly 440. Flute $428_0$, in another aspect, may comprise a vertex 460. It is noted that the vertex 460 may be generally perpendicular with a horizontal and/or may be at an angle other than horizontal from the perpendicular. In another aspect, the cross-sectional perimeter 462 of the flute $428_0$ may generally increase from proximal bottom 430 to terminal end 438. The blender container 420 may include various other designs, configurations, or numbers of flutes $428_0$ and $428_1$.

According to one or more embodiments, blender container 420 may include a handle 404 that may be monolithically formed with blender container 420, may be attached (e.g., removably or irremovably) thereto, and/or may include other components such as an over-molded grip, rubberized grip or the like. It is noted that handle 404 may include various shapes and dimensions, such as an ergonomic shape that may allow a user to comfortably and securely grasp the handle 404. It is also noted that blender container 420 may comprise a different number of handles (e.g., 0, 2, 3, etc.).

Blender container 420 may, in embodiments, include a spout 468. The spout 468 may be monolithically formed with the side wall 426. The spout 468 may extend from generally below terminal end 438 of the flutes $428_0$ and $428_1$ to the open end 422. The spout 468 may allow a user to easily pour foodstuff.

Blender container 420 may be configured to attach to a blender base, such as via apron 452 and/or blade assembly 440. In an aspect, apron 452 may comprise receiving members that may receive attachment members or protrusions from a blender base (e.g., a pedestal of a blender base). For instance, the apron 452 may comprise one or more corners that are sized and shaped to receive protrusions (not shown) of a blender base. It is noted that apron 452 may be attached to a blender base via other means, such as via threaded portions or the like.

A retainer nut assembly 450 may operatively attach to the container 420, and/or may allow for mounting of the blade assembly 440. In an aspect, the retainer nut assembly 450 may be disposed within apron 452. Retainer nut assembly 450 may comprise a weight that is increased from traditional retainer nut assemblies. The increased weight of retainer nut assembly 450 may decrease vibrations, wobbling, and/or noise when blade assembly 440 is in motion. For instance, blade assembly 440 may be driven by a motor. The motor may cause the blade assembly 440 to rotate at high speeds. Rotation of the blade assembly may allow for blending of foodstuff within blender container 420. In an aspect, the increased weight of the retainer nut assembly 450 may offset or reduce the vibration of the blade assembly 440. Reduced vibration may allow for decreased noise and improvement of the blender system 400.

Blade assembly 440 may include one or more blades, such as top blade 442 and bottom blade 444, as described in more detail herein. It is noted that top blade 442 and bottom blade 444 may be monolithically formed, removably joined or attached (e.g., welded, etc.), or may be of separate construction and/or irremovably attached together. In an aspect, top blade 442 and bottom blade 444 may be mounted or attached (e.g., irremovably or removably) to other portions of blade assembly 440. It is noted that top blade 442 is referred to as "top" and bottom blade 444 is referred to as "bottom" based on relative mounting positions as shown in FIG. 4. However, in other embodiments, top blade 442 and bottom blade 444 may be monolithically formed and/or mounted at a common vertical position relative to axis Z. As such, reference to "top" and "bottom" are provided for purpose of explanation and clarity.

In various embodiments, top blade 442 or bottom blade 444 may be configured to such that a distal end of such blades pass closer to various portions of blender container 420 (e.g., flutes, exaggerated members, sides, a bottom, etc.) at any given time than conventional wisdom teaches. Such may allow for more efficient blending of foodstuff (e.g., reduced blending times). For instance, a lowest vertical point of top blade 442 or bottom blade 444 along Z-axis may be a distance from bottom 430. The distance 480 may, for example, be between about 1 mm and about 5 mm. In at least one embodiment, a terminal end of top blade 442 or bottom blade 444 may be a minimum distance from exaggerated member $434_0$ during rotation of top blade 442 and bottom blade 444 about the Z-axis. It is noted that blade assembly 440 may comprise aspects of the various blade assemblies disclosed herein.

It is noted that the blades 442 and 444—as well as other blades disclosed herein—may be substantially closer to flutes $428_0$-$428_1$, exaggerated members $434_0$ and $434_1$, or a bottom 430 at a closest point during rotation of the blades compared to traditional systems, as described herein. For instance, a blade may be within j mm to an exaggerated member or flute at a closest point. In another aspect, a blade may be within k mm to a bottom of a container at a closest point, where j and k are numbers. In an example, j may be about 1 mm and k may be about 2 mm. It is noted that the relationship between the blades 442 and 444, and the container 420 may be described as a relative distances (e.g., blade 422 may span a percentage of a diameter of container 420). As such, blender system 400 may comprise similar aspects as those described with reference to the other disclosed figures (e.g., such as FIGS. 1-3, 5-11, etc.). In embodiments not including exaggerated members or flutes, a blade of a blade assembly may be substantially closer to a blender container wall than those of traditional systems.

FIGS. 5-9 are a blade assembly 500 that may be utilized in connection with various other aspects of the present disclosure. For instance, blade assembly 500 may be utilized in connection with blending assemblies 100, 200, 300, 400, etc. Moreover, it is noted that blade assembly 500 may be substantially similar to blade assembly 240. In various embodiments, one or more blades of blade assembly 500 may be closer to walls or a bottom of a blender container than conventional systems would deem appropriate as described herein.

Blade assembly 500 may include one or more blades or sections of a blade. For example, blade assembly 500 may include a top blade 542 and a bottom blade 544. While embodiments generally refer to blades, it is noted that various blades may be a single blade with one or more sections of wings, multiple blades or wings that are attached or coupled (e.g., about an axis W), or other configurations. Further, while embodiments generally describe four wings, it is noted that blade assembly 500 may include other numbers of wings.

In various embodiments, top blade 542 and bottom blade 544 may be monolithically formed, separately formed, attached (e.g., removably or irremovably) to each other, or may be constructed via one or more sections or components. For instance, a first side or first wing 502 of top blade 542, and a second side or second wing 504 of top blade 542 may be monolithically formed or otherwise joined. Likewise, a first side or first wing 512 of bottom blade 544, and a second side or second wing 514 of bottom blade 544 may be monolithically formed or otherwise joined.

Top blade 542 and bottom blade 544 may be generally perpendicular with each other. Further, top blade 542 and bottom blade 544 may be generally coaxial with each other and/or axis W. It is noted that other embodiments may include various other formations or configurations. For instance, top blade 542 and bottom blade 544 may intersect at obtuse or acute angles (e.g., they may be other than generally perpendicular as shown in FIGS. 5-9). Such embodiments are within the scope and spirit of this disclosure.

It is noted that dimensions of blade assembly 500 may be based on dimensions of one or more containers (e.g., blender container 120) that may be associated with blade assembly 500. For instance, a length of top blade 542 and/or bottom blade 544 may be configured such that top blade 542 and bottom blade 544 do not contact portions of a blender container (e.g., walls, exaggerated flutes, bottom, or flutes). For instance, a distance from wing tip 522 to wing tip 552 may, when blade assembly 500 is operatively coupled to a blender container, span about 94-95% of the distance between apposed exaggerated portions. In another example, a distance from wing tip 562 to wing tip 564 may, when blade assembly 500 is operatively coupled to a blender container, span about 95-96% of the distance between apposed exaggerated portions. In another aspect, a distance from wing tip 522 to wing tip 552 may, when blade assembly 500 is operatively coupled to a blender container, span about 71-83% of the diameter of a container. Moreover, a distance from wing tip 562 to wing tip 564 may, when blade assembly 500 is operatively coupled to a blender container, span about 72-84% of the diameter of a container. As described with reference to FIGS. 1-3, the blades 542 and 544 may have other appropriate sizes.

According to at least one embodiment, a lows point of blade 542 or 544 may be within S mm and D mm from a bottom of a blender container, where S and D are numbers and S is less than D. For instance, S may be about 0.5 mm and D may be about 3 mm. In another aspect, blades may come within F mm and G mm from blender walls, where F and G are numbers and F is less than G.

Figure 5:
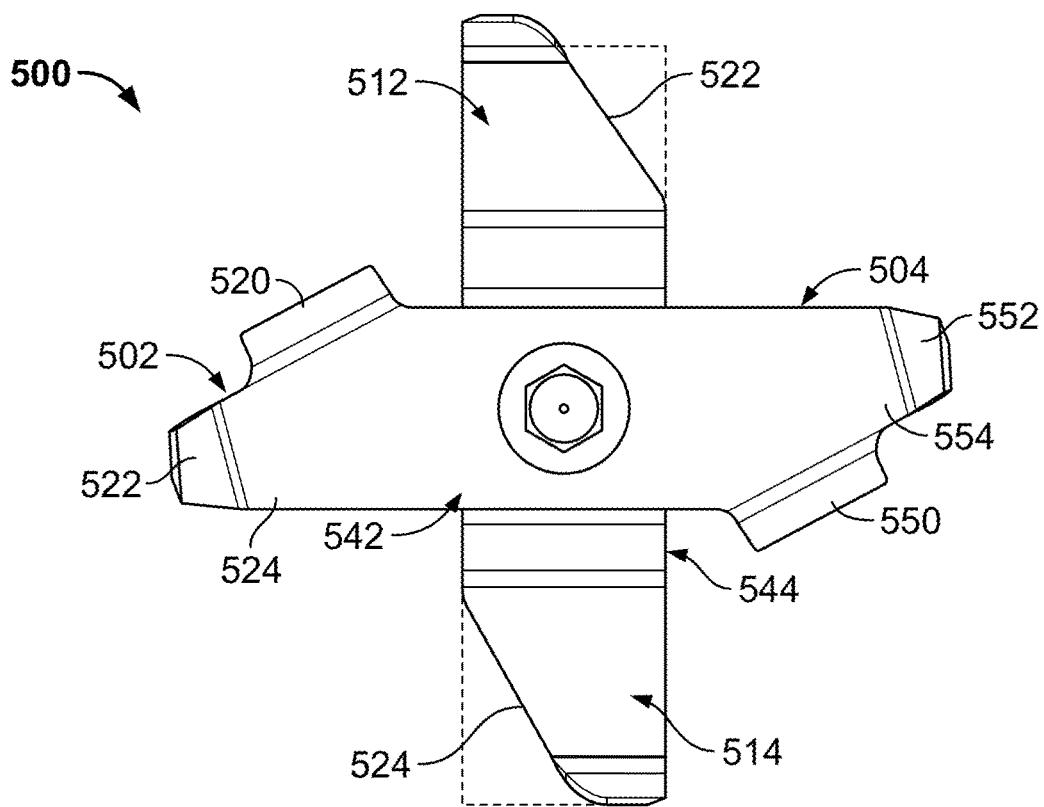
FIG. 5 is a top plan view of a blade assembly.
Figure 6:
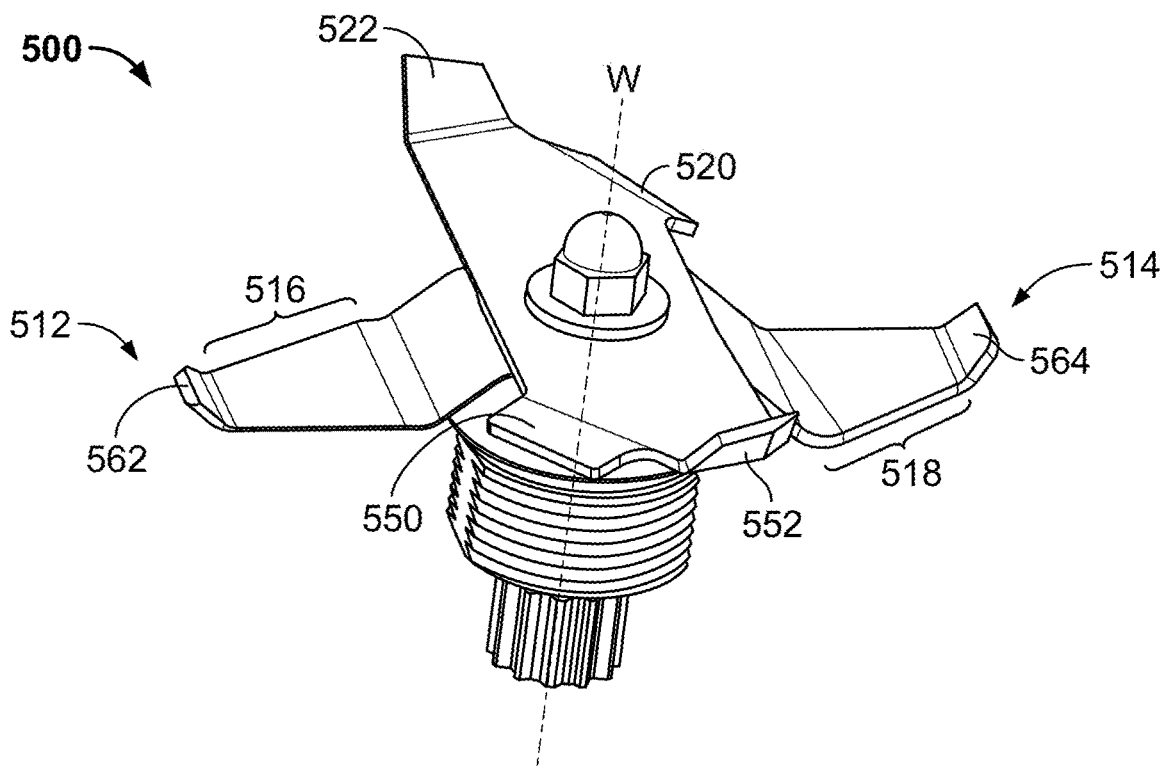
FIG. 6 is a top, front and left prospective view of the blade assembly.
Figure 7:
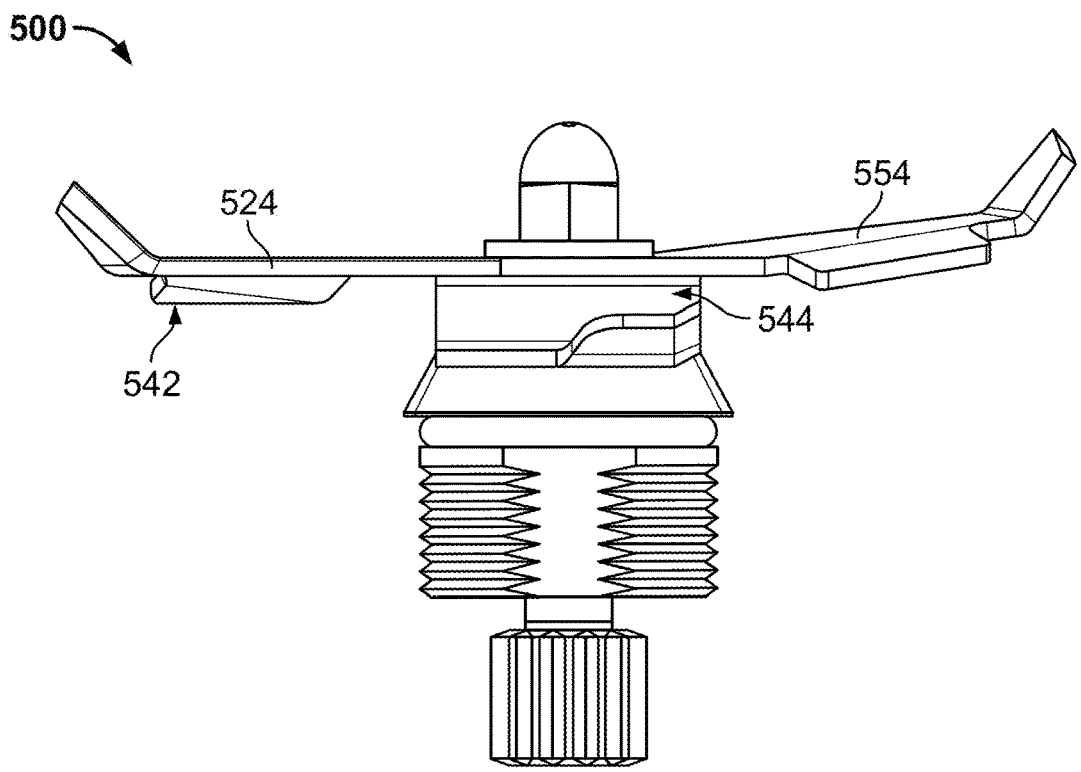
FIG. 7 is a front elevation view of the blade assembly.
Figure 8:
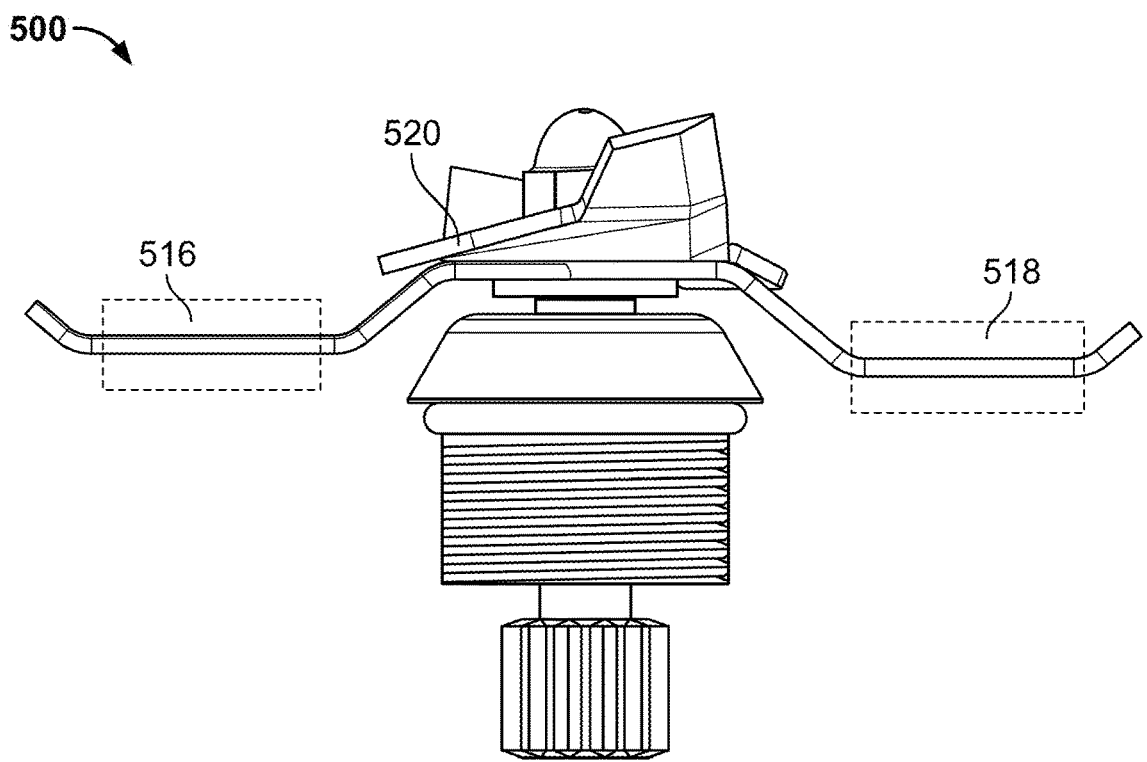
FIG. 8 is a right elevation view of the blade assembly.
Figure 9:
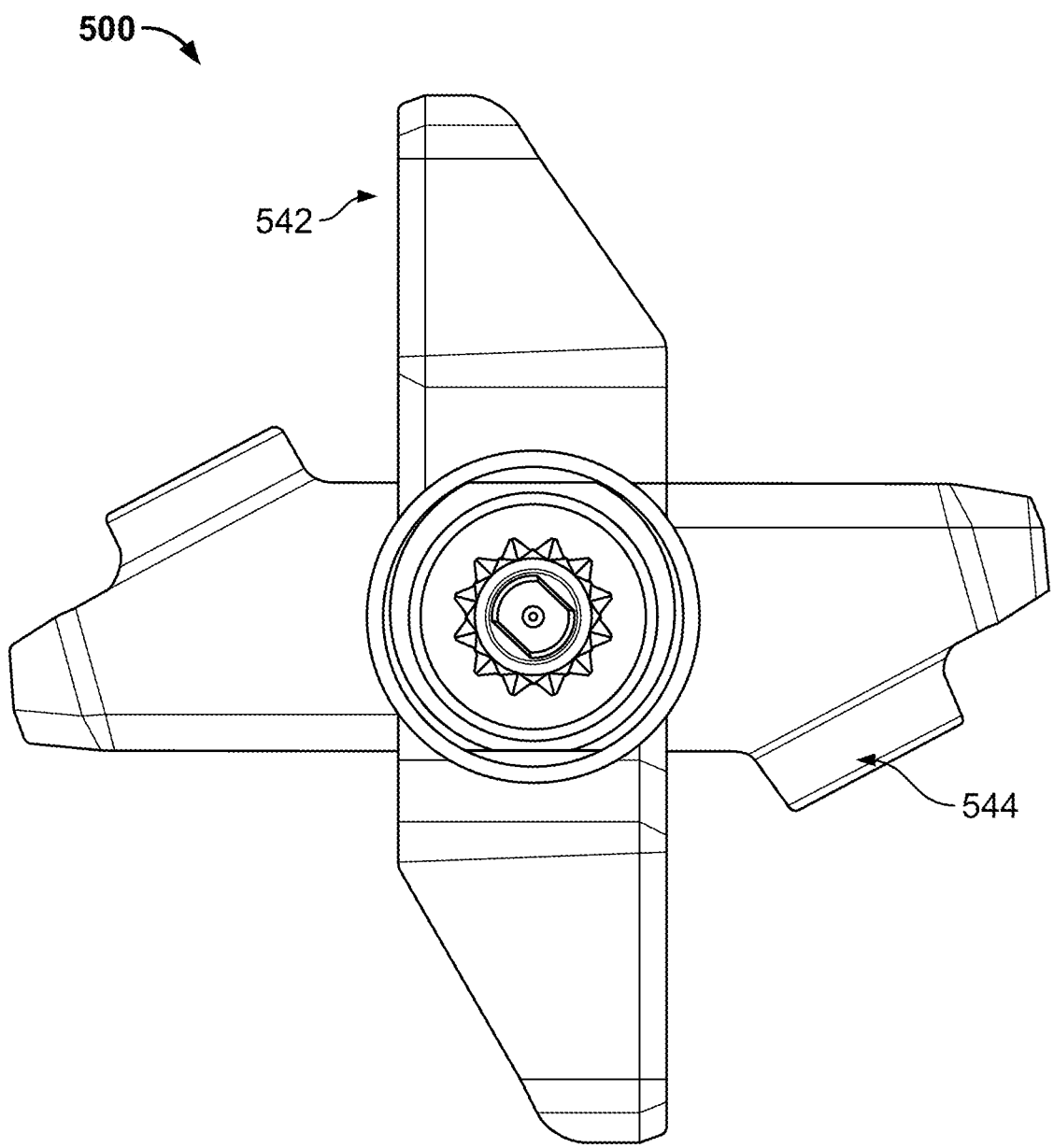
FIG. 9 is a bottom plan view of the blade assembly.

First wing 512 and second wing 514 of bottom blade 544 may comprise substantially similar configurations that may mirror each other. For instance, first wing 512 may comprise offset portion 516, and second wing 514 may comprise offset portion 518. Offset portions 516 and 518 may be offset from a mounting plane portion 520 (as seen in FIG. 8). In another aspect, offset portions 516 and offset portion 518 may be vertically offset from each other, such that offset portions 516 and offset portion 518 are not coplanar. Trail edges 522 and 524 of offset portions 516 and 518, respectively, may be relieved of material. For instance, dotted lines in FIG. 5 show areas of relieved material at trail edges 522 and 524.

Wings 502 and 504 may respectively comprise wing tabs 520 and 550 extending body portions 524 and 554. Each tab portion 520 and 550 may extend downwards relative the plane of the body portions 524 and 554. In another aspect, wings 502 and 504 may respectively comprise wing tips 522 and 552 that generally extend at an upwards angle relative the plane of the body portions 524 and 554. It is noted "upwards" and "downwards" are directions relative to the illustrated drawings. Moreover, said wing tabs 520 and 550, and said wing tips 522 and 552 may extend at other angles. For instance, wing tabs 520 and 550 may extend upward and said wing tips 522 and 552 may extend downward. According to at least one embodiment, body 554 of the second wing 504 may be pitched relative axis W and/or body 524.

It is further noted that first wing 512 and second wing 514 of bottom blade 544 may respectively comprise wing tips 562 and 564 that may generally extend upward angles with respect to planes of offset portions 516 and 518. It is noted, however, that the wing tips 562 and 564 may extend at other angles.

Figure 10:
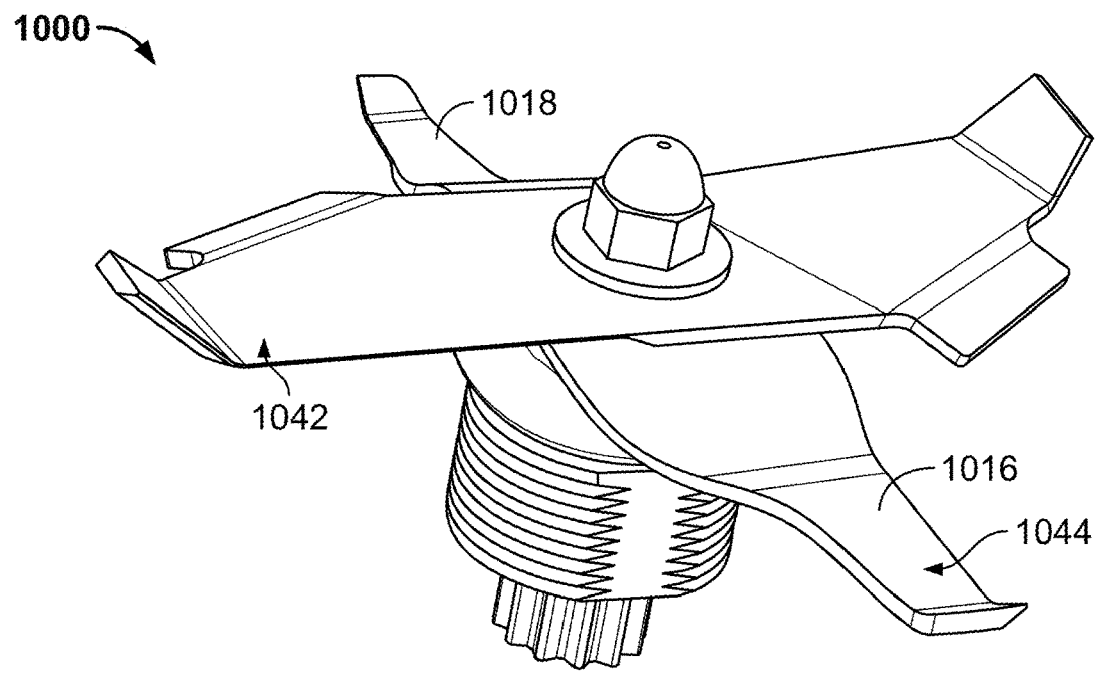
FIG. 10 is a top, front and right prospective view of another blade assembly.
Figure 11:
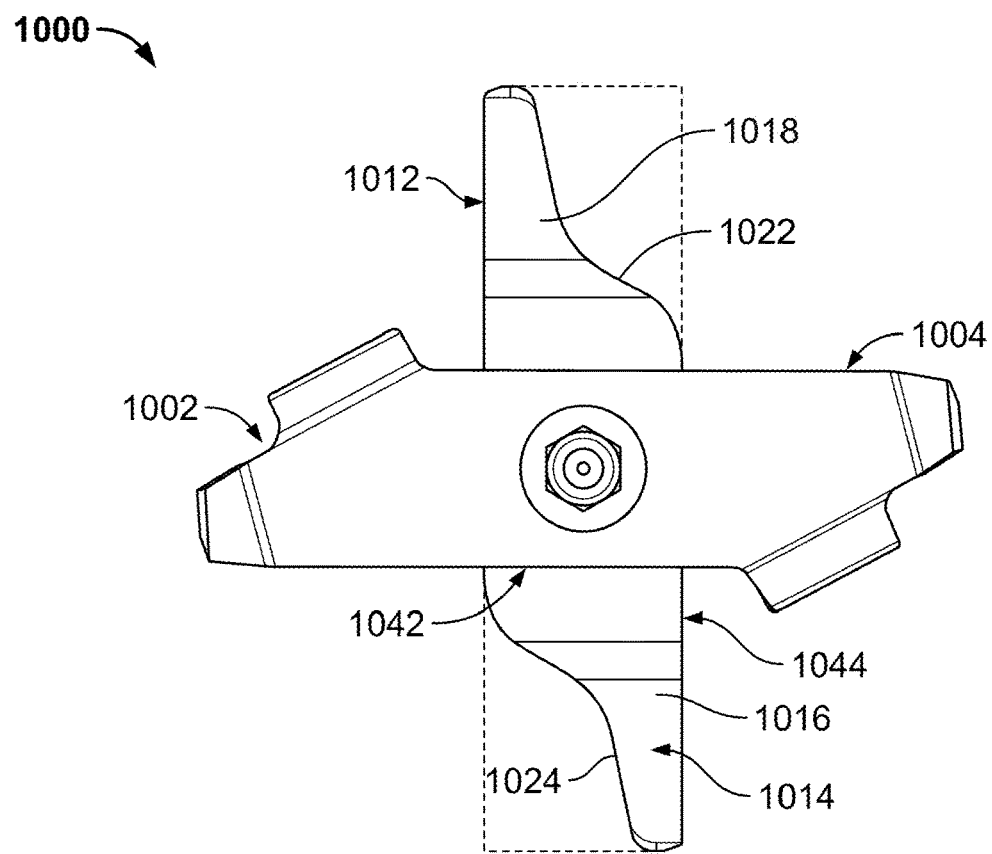
FIG. 11 is a top plan view of the blade assembly.
Figure 12:
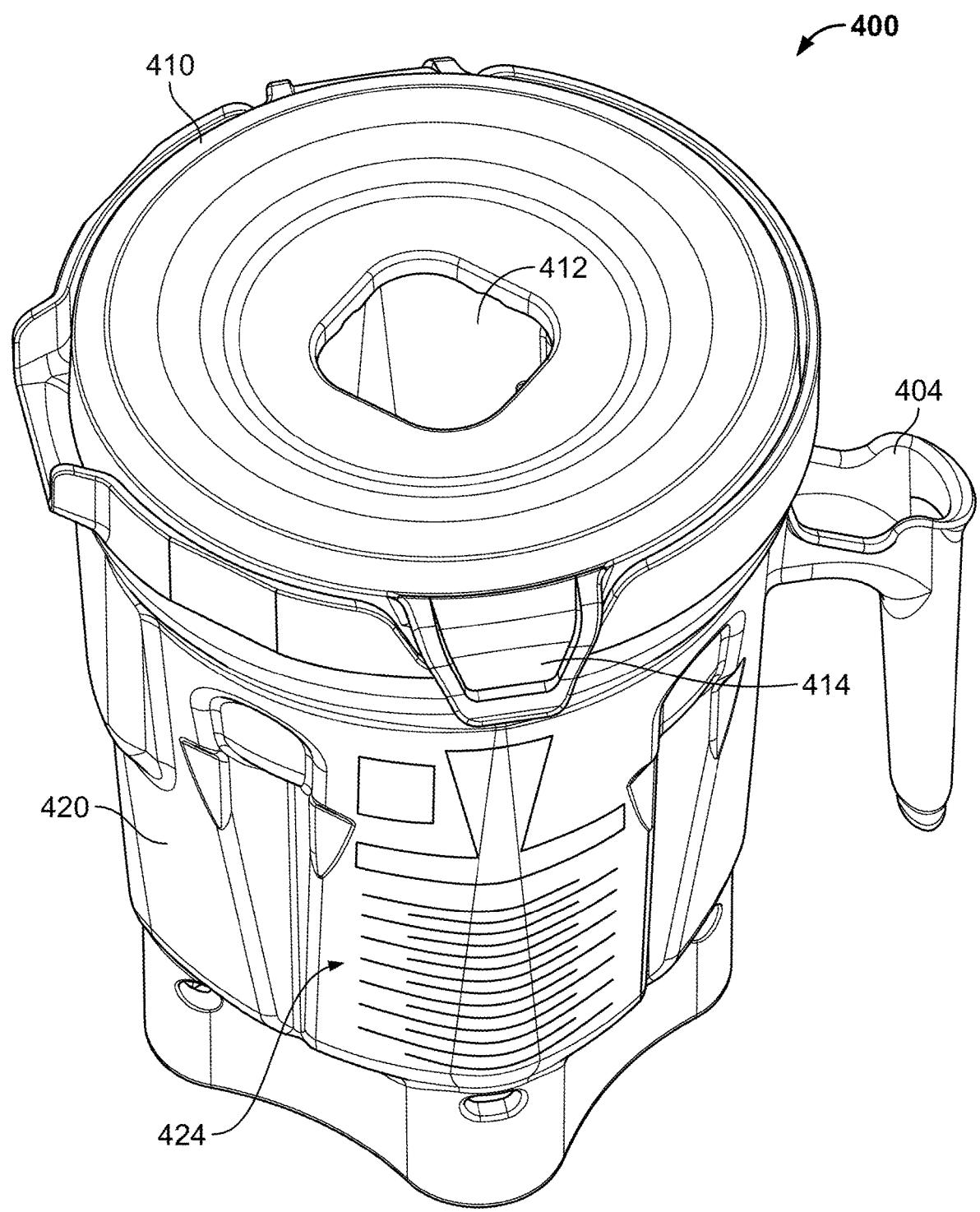
FIG. 12 is a prospective front view of a blender container and an attachable lid.
Figure 13:
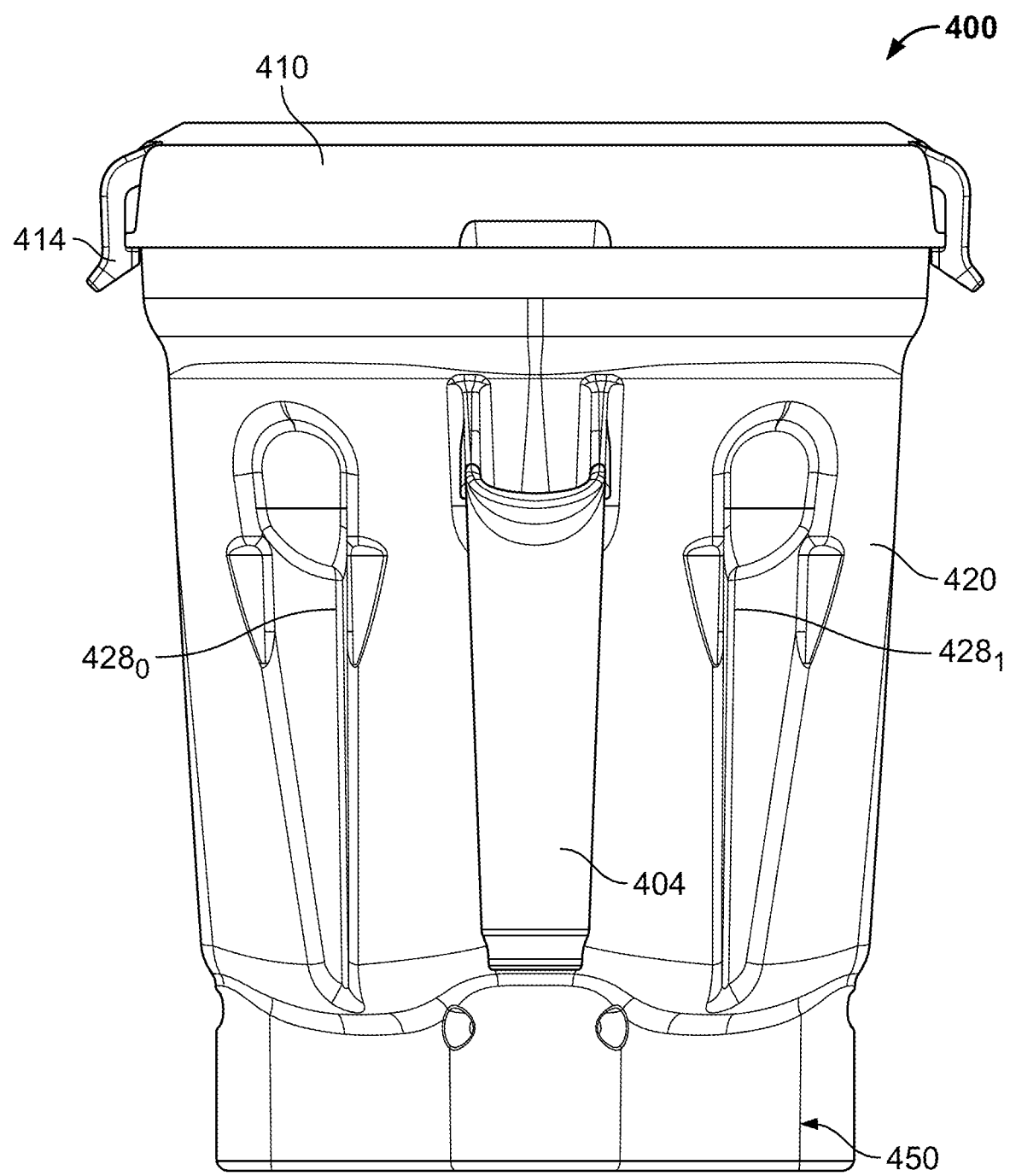
FIG. 13 is a left side view of the blender container and lid of FIG. 12.
Figure 14:
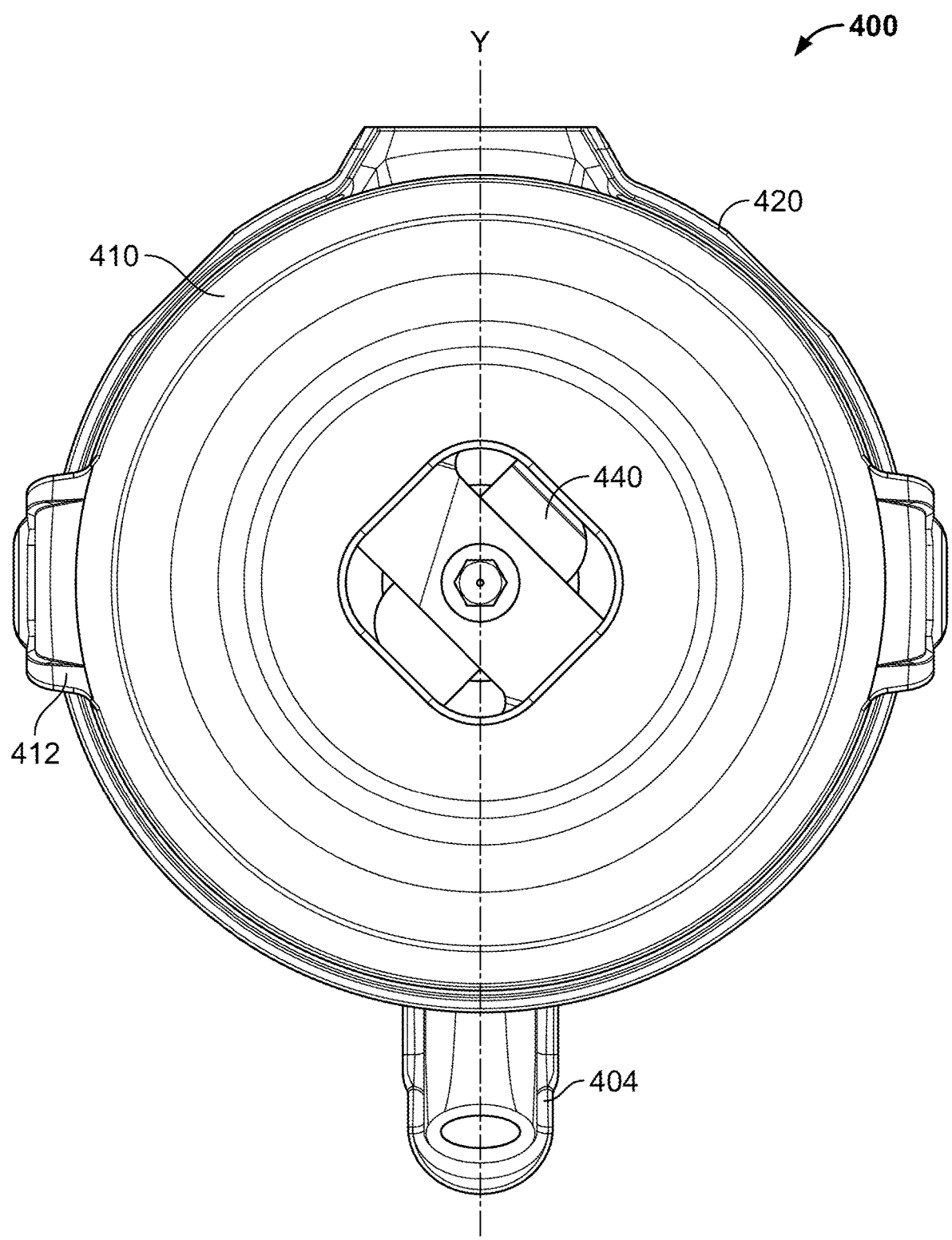
FIG. 14 is a top side view of the blender container and lid of FIG. 12.

FIGS. 10-11 are a blade assembly 1000, in accordance with various aspects disclosed herein. It is noted that various aspects of blade assembly 1000 and blade assembly 500 may comprise substantially similar functionality or aspects. As depicted, blade assembly 1000 may include a top blade 1042 and a bottom blade 1044. Top blade 1042 may include a first wing 1002 and a second wing 1004. Likewise, bottom blade 1044 may include a first wing 1012 and a second wing 1014. First wing 1012 and second wing 1014 may respectively include trail edges 1022 and 1024. Trail edges 1022 and 1024 may be configured to be substantially relieved or void of material such as shown by the dotted lines in FIG. 11, such that first wing 1012 and second wing 1014, or a portion thereof, generally represent a triangle or right triangle. It is noted that trail edges 1022 and 1024 may be curved, substantially straight, or otherwise configured. In another aspect, bottom blade 1044 may comprise offset portion 1016 and offset portion 1018 that may be vertically offset from each other and/or mounting plane 1020. That is, offset portion 1018 may be on a first plane and offset portion 1016 may be on a second plane.

As described here as well as elsewhere, the blades 1042 and 1044 may be generally closer to side walls, a bottom, flutes, exaggerated members, or other portions of a container with respect to previous systems. According to at least one embodiment, the length of the blades 1042 and 1044 may be generally similar to what has been described with reference to the various other embodiments.

Turning to FIGS. 12-15, with reference to FIG. 4, depicts a container 420 and lid 410 that is attachable to the container 420. Lid 410 may be attachable (e.g., removably or irremovably) with blender container 420. The lid 410 may be attachable via a friction fit, magnetic attachment, fastener, or the like. For instance, lid 410 may include a body 418 and a flange 416 extending therefrom. When the lid 410 is attached to the container 420, the flange 416 may extend downwards (e.g., within the container 420). The flange 416 may press against the side wall 426 of the container. In at least one embodiment, the flange 416 and the side wall 426 may form a seal that generally prevents foodstuff from passing between the flange 416 and side wall 426.

The lid 410 may include an aperture 412 that may allow a user to add ingredients to blender container 420 when the lid 410 is attached thereto. The aperture 412 may operatively receive a plug (not shown) that closes the aperture 412 while the blender is in use. In another aspect, the aperture 412 may receive a tool. For example, a user may insert a tool, such as a tamper, into aperture 412 to manipulate foodstuff 412 during a blending process. It is noted that blender system 1900 may include a lid cap that may be inserted into aperture 412 to close or seal the aperture 412. Lid 410 may include one or more latches 414 that may latch or secure the lid 410 to the blender container 420. In an aspect, latches 414 may be biased towards axis 1906 such that the latches 414 apply a force towards blender container 420. It is noted that blender container 420 may comprise one or more ledges or flanges and latches 414 may secure to the ledges. It is further noted that blender system 400 may include other components for securing the lid 410 to the blender container 420, such as threaded members, magnetic members, or the like.

The user may utilize indicia 424, which may comprise gradient markings, to measure the amount of foodstuff placed within the blender container 420. In an example, the markings may comprise numeric markings in a unit of measurement, such as fluid ounces. It is noted that other measurement systems may be utilized. It is further noted that indicia 424 may comprise engravings, painted markings, of the like.

Figure 15:
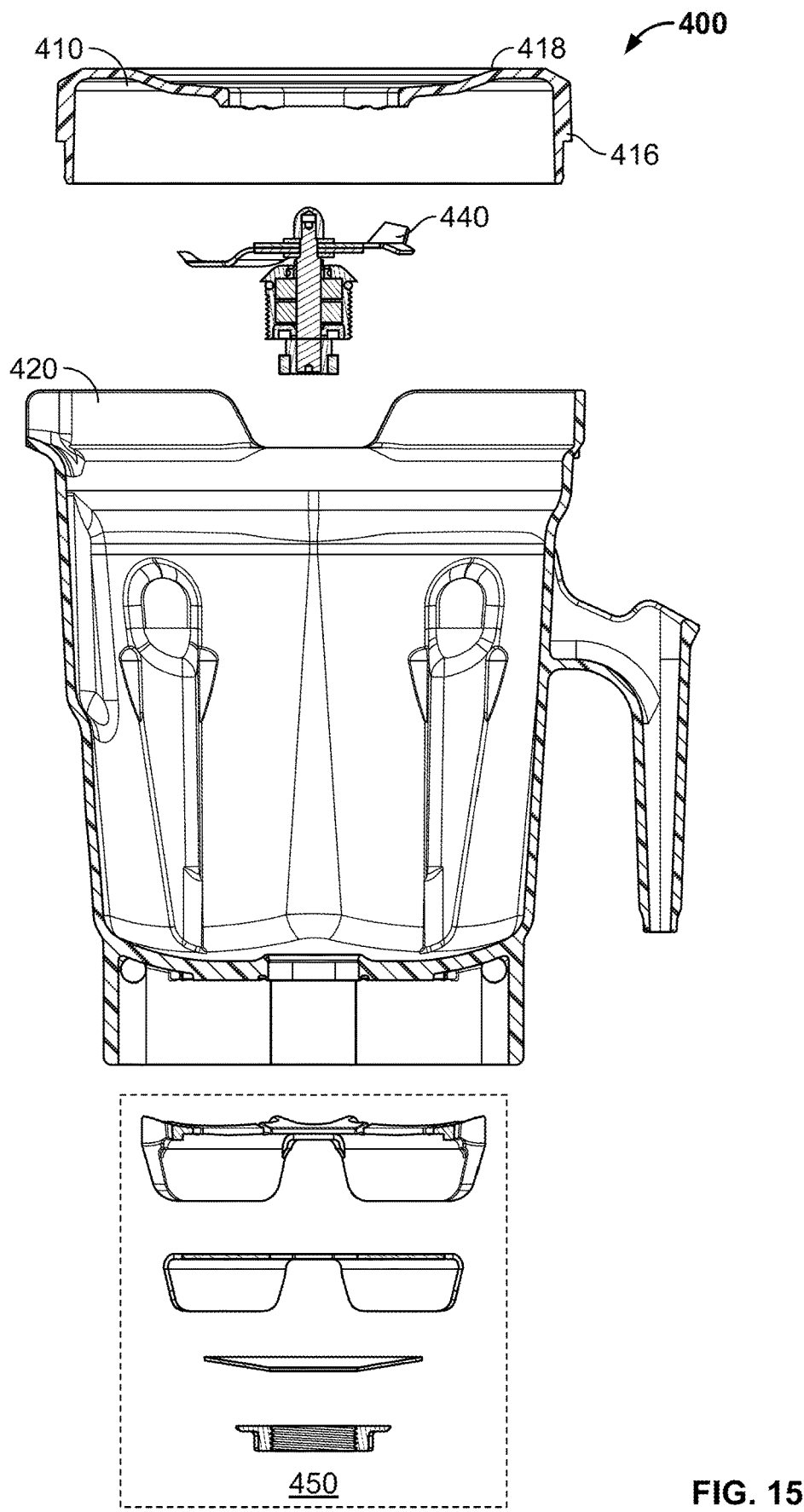
FIG. 15 is an exploded, cross-sectional view of the blender container and lid of FIG. 12.

FIG. 15 is an exploded, cross-sectional view of the lid 410 blender container 420, the blade assembly 440, and retainer nut assembly 450 along axis Y in accordance with various described embodiments. In an example, blade assembly 440 may be inserted into blender container 420. Blade assembly 440 may be secured via retainer nut assembly assembly 450. It is noted that the blade assembly 440 may be attached to the blender container 420 such that foodstuff cannot escape bottom 430 of the blender container 420.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blender assembly comprising:
   a blender container having a cavity and comprising:
      a side wall, a closed end, and an open end;
      at least one flute protruding from the side wall and extending into the cavity; and
      at least one exaggerated flute extending from the side wall and extending into the cavity; and
      a blade assembly operatively attached to the blender container, wherein the at least one exaggerated flute extends from the side wall into the cavity for a first distance, and the at least one flute extends from the side wall into the cavity for a second distance, wherein the first distance is greater than the second distance, and
      wherein the blade assembly comprises: at least one blade, the blade including a distal end that is no more than about 1 millimeter from the at least one exaggerated flute when the blade assembly is attached to the blender container, and
      wherein the at least one exaggerated flute member comprises a terminal end that is generally level with or above a highest point of the blade assembly as measured from the closed end.

2. The blender assembly of claim 1, wherein the terminal end that comprises a stop that operatively prevents an insert from being operatively inserted past a desired level.

3. The blender assembly of claim 1, wherein the at least one exaggerated member extends from the at least one flute member.

4. The blender assembly of claim 1, further comprising a retainer nut assembly operatively attached to the blender container.

5. The blender assembly of claim 4, wherein the retainer nut assembly weighs between about 200 and 500 grams.

6. A blender container operatively attached to a blender base, the blender container comprising:
- a side wall, a closed end, and an open end;
- a flute extending from the side wall towards a central axis of the container; and
- a blade assembly disposed within a cavity of the blender container, the blade assembly comprising at least one blade;
- wherein the flute comprises an exaggerated flute member proximal the blade assembly, and wherein the exaggerated flute member extends from the side wall axis towards a central axis of the container and a vertex of the exaggerated flute member is closer to the central axis than a vertex of the flute, and wherein the exaggerated flute member comprises a terminal end that is generally level with or above a highest point of the at least one blade of blade assembly as measured from the closed end of the container.

7. The blender container of claim 6, wherein a perimeter of the side wall is generally square proximal the closed end.

8. The blender container of claim 7, wherein the perimeter transitions to generally elliptical proximal the open end.

9. The blender system of claim 6, wherein the flute comprises a cross-sectional perimeter that generally increases in area from proximal the closed end to a terminal end of the flute.

10. The blender container of claim 6, wherein the blade assembly comprises at least one blade.

11. The blender container of claim 10, wherein at least a portion of the blade is within 1 millimeter of the closed end.

\* \* \* \* \*